May 17, 1966 J. J. NEWGARD ETAL 3,251,542
CENTRIFUGAL SEPARATION OF CRYOGENIC GASEOUS MIXTURES
Filed May 29, 1963
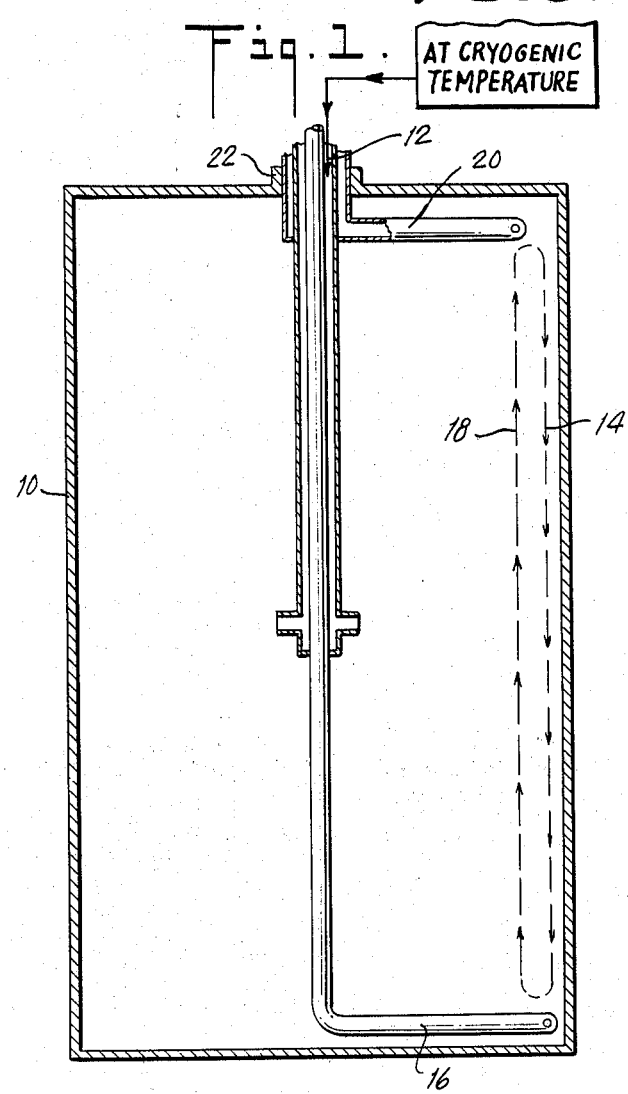
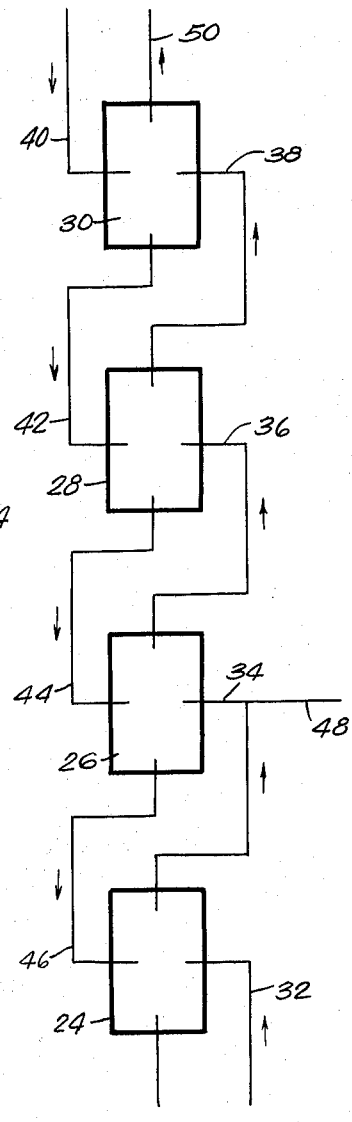
INVENTORS
JOHN J. NEWGARD
BY VINCENT V. ABAJIAN
ATTORNEY : 3,251,542
Patented May 17, 1966

3,251,542
CENTRIFUGAL SEPARATION OF CRYOGENIC GASEOUS MIXTURES
John J. Newgard, Boonton, and Vincent V. Abajian, North Caldwell, N.J., assignors to Electro-Nucleonics, Inc., Caldwell, N.J., a corporation of New Jersey
Filed May 29, 1963, Ser. No. 284,065
6 Claims. (Cl. 233—11)

This invention relates to the centrifugal separation of cryogenic gaseous mixtures. In particular, the invention contemplates a method for separating difficult to separate gaseous mixtures into their constituents by lowering the temperature of the gaseous mixture into the cryogenic temperature range and then separating the constituents thereof under centrifugal force.

At present one of the most general techniques for the separation of cryogenic gaseous mixtures, i.e. gases whose temperatures are in the range of 200° K. or below (although in some work, any temperature below 273° K. is referred to as cryogenic temperature), whose boiling points differ, involve first the condensation of the mixture by application of pressure, and then the partial differential evaporation of one or more of its components.

Continuous repetition of the condensation-evaporation cycle can lead to separation of the components of the gaseous mixture into very high purity constituent gases. Generally, in the case of a two-component gaseous mixture whereof the boiling points of the components differ substantially, the gaseous mixture is cooled below its point of liquefaction. As the temperature of the condensate is driven lower and lower, it is found to contain a larger and larger fraction of the higher boiling point liquid. Relatively complete separation of the mixture can be obtained by this technique within the confines of not more than several reactor vessels. For example, separation of a mixture of 60% by volume of nitrogen and 40% by volume of helium can be accomplished by resort to this practice to produce better than 99.9% volume helium, which is the more economically valuable component.

For mixtures of gases whose cryogenic boiling points are relatively close together, as, for example, in the case of nitrogen-oxygen mixtures, simple condensation fails to achieve even poor separation. However, the vapor above the condensate is essentially different in composition from that of the liquid mixture. If this vapor is drawn off and condensed, its vapor will differ from that of the condensed liquid. A series of such continuous repetitive cycles can lead to a relatively good separation into the pure constituents of the original mixture.

The above processes are carried out under moderately high pressure, and at cryogenic temperatures in the region of 100° K. They require moderate capital investments in pumps, compressors, and special cryogenic handling equipment. Power costs are high.

The gas centrifuge can be used, as to be explained, for the separation of cryogenic gases within a few stages, at low capital investment, power, and operating costs per unit of separated product.

The gas centrifuge can generate internal gravitational fields capable of fractionating the original gaseous mixtures whereby a gaseous mixture richer in the heavier gases appears at the walls of the centrifuge and a gaseous mixture richer in the lighter gases appears closer to the center of the centrifuge, both relative to the original gaseous mixture fed into the centrifuge. Upon removal of the gaseous mixtures at the walls and at some appropriate distance closer to the center of the centrifuge, it is found that the new mixtures contain a concentration of heavier gaseous materials taken from the wall region and a concentration of lighter gaseous materials taken closer to the center of the centrifuge, again both relative to the original feed mixture of gases.

In the countercurrent cross-sectionally cylindrical gas centrifuge, the product material ratio of light (L) to heavy (H) gaseous material for a two-component gaseous mixture, relative to the same ratio of the material fed into the centrifuge, is given by equation (1):

$$\frac{(L/H)P}{(L/H)F} = \sqrt{\exp \cdot \frac{\Delta M v^2}{2RT}\left(\frac{L}{2r}\right)} \quad (1)$$

where $\Delta M$ is the mass difference between the heavy and light pure constituents of the gaseous mixture, $v$ is the peripheral velocity of the gas centrifuge, T is the average temperature of the gaseous mixture in the centrifuge, L is the effective separating length of the centrifuge, $2r$ is the inner cross-sectional diameter of the gas centrifuge, $(L/H)P$ is the ratio of the light-to-heavy composition of the product (P) gaseous mixture withdrawn from the centrifuge, and $(L/H)F$ is the ratio of the light-to-heavy composition of the feed (F) gaseous mixture admitted to the centrifuge. The term "exp." wherever it appears in the equations herein is read "exponential to the base $e$."

The product is a generic term depending upon what is the most desirable material to be obtained from the centrifuge. In the above equation, it is assumed that the lighter part of the gaseous mixture is the more economically desirable component of the separation process. The examples which are to follow are also based on this assumption.

Of the five important parameters—M, $v$, T, L and $2r$ in Equation 1, only the range of the temperature (T) has not been thoroughly explored in gas centrifuge work in the past. Generally, gaseous mixtures have been allowed to enter the gas centrifuge at or near normal room or ambient temperature conditions and have been discharged from the gas centrifuge at temperatures somewhat above normal room or ambient temperature conditions due to the heat of friction generated by frictional contact between the gaseous mixtures and the rapidly rotating wall of the centrifuge. Little or no consideration has been given to the temperature of the gaseous mixture within the gas centrifuge, except for the purpose of ascertaining whether this temperature is appreciably greater than the normal ambient temperature of the original gaseous feed mixture. With cryogenic gases, the temperature of the feed mixture becomes one of the most significant parameters in determining the technical and economic feasibility of the gas centrifuge to attain efficient gas separation.

It is, therefore, the purpose of the invention that the gas centrifuge, particularly those rotors having minimal bearings or bearing contacts, be operated in the cryogenic temperature region. These temperatures are to be obtained by feeding into the gas centrifuge cryogenic gas mixtures which are to be separated. This technique will produce a temperature (T) which is sufficiently low to materially enhance the separating effect of the mixture within the gas centrifuge, as indicated by Equation 1.

It is yet a further purpose of the invention to provide a method for the efficient separation of gaseous mixtures by subjecting such mixtures to the action of high speed centrifugal separation, while the gaseous mixtures are in the cryogenic temperature range.

It is a further purpose of the invention to provide a method for the effective and economical separation of gaseous components from mixtures of such components wherein the components are difficult-to-separate gases, or isotopes of the same gas.

It is a particular object of the invention to provide a technique for staging or cascading gas mixtures at cryogenic temperature through a plurality of centrifugal separating steps which multiply the separation possibility of a single gas centrifuge whereby large quantities of substantially pure gas can be obtained.

Both the broad and limited objectives of the invention will become clear by reference to the following examples and to the drawings forming a part of this application. In the drawings, like reference numerals indicate like parts, and:

FIG. 1 is a diagrammatic representation of a centrifugal gas separator constituting a single separating stage of the countercurrent type; and FIG. 2 is a diagrammatic representation of a plurality of centrifugal gas separators which are interconnected in tandem to form a cascade.

The physical separating steps of the method can be performed in either a single high speed centrifuge as diagrammatically shown in FIG. 1 or in a plurality of high speed centrifuges interconnected in cascade form as diagrammatically shown in FIG. 2 of the drawings. These centrifugal gas separators may be of the kind illustrated and described in Haakon D. Pedersen et al. application for United States patent, Serial No. 235,764, filed November 6, 1962, for a Pre-Stressed Centrifugal Drum.

In FIG. 1 a rotary separating cylinder 10 is adapted to receive a mixture of gases at cryogenic temperature through a cryogenic gaseous mixture feed inlet 12. As the cylinder 10 subjects the gaseous mixture to gravitational force, the enriched mixture will be disposed in a layer 14 of heavier gas adjacent the wall of the centrifugal cylinder. These heavier enriched components will flow toward the bottom of the cylinder where they can be removed through a suitable Pitot tube 16, whereas the layer of enriched lighter gaseous components 18 moves upward in countercurrent direction to the heavier enriched components at a point inwardly of the heavier enriched components. The enriched lighter components can be removed from the centrifuge by means of a suitable Pitot tube 20. In one arrangement, the mixture inlet 12 and the tubes 16 and 20, which are used for removing the heavier and lighter component mixtures 14 and 18, respectively, may be concentrically arranged at a passage 22 in the top wall of the centrifugal cylinder. In some arrangements, the bottom and top Pitot tubes 16 and 20 must be partially shielded from each other with a suitable baffle arrangement in order to achieve high gas separation efficiency.

In FIG. 2, for example, four centrifugal separating cylinders 24, 26, 28 and 30 are interconnected in tandem to form a separating cascade in which the light fraction of the gaseous mixture will move upwardly and the heavy fraction of the gaseous mixture will move downwardly. In this figure, feed ports 32, 34, 36 and 38 interconnect alternate cylinders with the one immediately thereabove and waste ports 40, 42, 44 and 46 interconnect each alternate cylinder with the one immediately therebelow. Thus, when an original feed mixture of gases is admitted at an inlet 48, the described countercurrent cascading flow of light and heavy fractions will take place in the several stages of the cascade until the desired product, in this case the light fraction, is discharged at a product outlet port 50 of the unit 30.

The above cascade is an example of but one type of cascade. The cascade can be extended in the vertical direction beyond four units in tandem. Likewise, the cascade can be broadened in the horizontal direction to include many more than one unit per stage. The length and breadth of the cascade depend on the quality and quantity of the product material desired.

The several centrifugal separating cylinders are usually operated at peripheral velocities which can range from 350 meters per second to 500 meters per second; although useful products can be obtained at peripheral velocities as low as 200 meters per second and at speeds possibly as high as 1000 meters per second.

A number of specific examples will demonstrate the validity of the technique for the high speed centrifugal separation of a gaseous mixture which is accomplished at cryogenic temperatures as taught herein.

Consider the separation of a cryogenic gaseous mixture of 60% by volume of helium (He), mass number 4, and 40% by volume of nitrogen ($N_2$), mass number 28, and helium-3 and helium-4. We assume first a cryogenic gaseous mixture of 60% by volume of helium and 40% by volume of nitrogen. The latter ratio is approximately that of the normal gaseous mixture obtained from natural gas in the conventional cryogenic separation of helium from gas. Thus Equation 1 becomes:

$$\frac{(He/N_2)P}{(He/N_2)F} = \sqrt{\exp. \frac{24v^2}{2RT} \left(\frac{L}{2r}\right)}$$

since $\Delta M = 28 - 4 = 24$.

Assume further that the cryogenic gaseous mixture fed into the gas centrifuge is at a temperature (T) of 77.3° K., which is approximately the boiling point of liquid nitrogen. For relatively small bearingless centrifuges, the length (L) can range from 12 to 20 inches or in which the $L/2r$ ratio is from 4/1 to 5/1. The velocity ($v$) may range from 350 meters per second to 500 meters per second for the purpose of the present presentation, although, as stated, it is theoretically possible to operate the separators at speeds up to 1000 meters per second.

Thus the following analyses indicate the great advantage of operating the gas centrifuge in the cryogenic temperature region rather than at normal room or ambient temperature (T) of 300° K.

*Example I*

Assume the separation of helium from nitrogen from a mixture thereof wherein the ratio of helium to nitrogen in the feed gas $(He/N_2)F = 1.5$ (i.e. 60% by volume helium and 40% by volume nitrogen) at 300° K. in a centrifuge having an $L/2r$ of 5, and rotating at a peripheral velocity of 350 meters per second. Thus, from Equation 1, $(He/N_2)P = 2.09 \times 1.5 = 3.14$, or an output of 75.9% helium and 24.1% nitrogen in a single pass through the gas centrifuge.

*Example II*

Assuming again the separation of helium from nitrogen from a mixture thereof wherein the ratio of helium to nitrogen in the feed gas $(He/N_2)F = 1.5$ at the reduced temperature of 77.3° K. in a centrifuge having an $L/2r$ of 5, and rotating at a peripheral velocity of 350 meters per second. Thus, from Equation 1, $(He/N_2)P = 17.5 \times 1.5 = 26.3$, or an output of 96.3% helium and 3.7% nitrogen in a single pass through the gas centrifuge.

Similarly, it can be shown that at a temperature (T) of 300° K. and a peripheral velocity of 500 meters per second, the ratio $(He/N_2)P$ equals 6.64, and the product gaseous mixture from the countercurrent gas centrifuge of FIG. 1 increases to 86.9% helium and 13.1% nitrogen from an original gaseous feed mixture of 60% helium and 40% nitrogen. Strikingly, at a temperature of 77.3° K. and at a peripheral velocity of 500 meters per second, $(He/N_2)P$ equals 500, and the gaseous product mixture from the countercurrent gas centrifuge increases to 99.81% helium and 0.19% nitrogen from an original gaseous feed mixture of 60% helium and 40% nitrogen. These examples clearly show the increase in the efficiency of the gas centrifuge when operating on gaseous mixtures which are in the cryogenic temperature range.

When operating the separators at both 350 meters and 500 meters velocity per second, very pure helium gas can be obtained by operation of gas centrifuges with the gaseous feed mixture 60% He–40% $N_2$ within the cryogenic temperature range.

As stated above, the method can be applied for obtaining even higher quality and greater quantity continuous gas separations by utilizing a number of interconnected gas centrifuges in cascade, as diagrammatically shown in FIG. 2. In general, the individual units operating in the cryogenic region should all be interconnected in such manner that the output of one unit becomes the input of another unit. Thus, as the light gaseous mixture is fed toward the top of a cascade, it becomes richer and richer in the light component, as briefly described above in connection with FIG. 2.

It is readily seen from the above development applied to helium-nitrogen gaseous mixtures that very few in tandem centrifuge stages are required to obtain close to 100% purity of the light material, i.e. helium, if the cascade is operated in the cryogenic temperature region.

An approximate formula indicating the quality of separation effected by a gas separating cascade operating in the cryogenic temperature region is given by the following Equation 2:

$$\frac{(L/H)_{Pn}}{(L/H)F} = \left[\sqrt{\exp.\frac{\Delta M v^2}{2RT}\left(\frac{L}{2r}\right)}\right]^n \quad (2)$$

where $n$ is the number of in tandem stages through which the light to heavy $(L/H)$ ratio is enriched in the light gaseous component of the gaseous mixture, and $(L/H)_{Pn}$ is the ratio of the light to heavy gaseous component from the $n$th stage. Thus, for the case—

$T = 77.3°$ K.
$L/2r = 5$
$v = 350$ meters per second
$(He/N_2)F = 1.5$
$n = 3$

Equation 2 then shows that $(He/N_2)P3$ equals $$(17.55)^3 \times 1.5$$

which equals 8110. Hence, this means that after three in tandem passes the purity of helium becomes 99.99% which is a purity comparable with the best separations resulting from the conventional cryogenic techniques. Thus, cryogenic gas centrifugal separation at the peripheral centrifugal velocities referred to herein can produce substantially pure gaseous products from two or more gas centrifuges operated in cascade. This novel cryogenic technique, therefore, permits a commercial application of the gas centrifuge to the separation of helium from nitrogen, for example. Other gaseous mixtures, such as oxygen and nitrogen or argon and air, can be centrifugally separated with equal ease when the mixtures are in the cryogenic temperature range, as well as isotopic components of a cryogenic gas.

It is known that one of the most difficult separations that can be undertaken by any known technique or device is the separation of materials whose mass difference ($\Delta M$) between the major components to be separated differ by only 1. In the case of operation of gas centrifuges in the cryogenic region, high quality $\Delta M = 1$ separation can be performed utilizing a small number of gas centrifuges. For example, helium-3, a valuable experimentally useful helium isotope is found in association with helium-4 in gas wells to the extent of $1.7 \times 10^{-5}\%$ helium-3 relative to helium-4 at 100%. No techniques are presently known for concentrating helium-3 from a helium gas mixture in relatively large quantities. Operation of a gas centrifuge at 10° K. (the boiling point of helium is approximately 4° K. at standard conditions of temperature and pressure) can produce the following under the conditions noted:

Example III

Assume the separation of helium-3 from a mixture thereof with helium-4 at 10° K. in a centrifuge wherein $L/2r$ is 4, rotating at a peripheral velocity of 350 meters per second, and wherein the ratio of helium-3 to helium-4 in the feed mixture is $1.7 \times 10^{-7}$. Thus, from Equation 1 for one stage of separation (P1), $$(He^3/He^4)P1 = 4.35 \times 1.7 \times 10^{-7} = 7.4 \times 10^{-7}$$

or an output from one stage of only $7.4 \times 10^{-5}\%$ helium-3. Here it is assumed that a lower $L/2r$ holds because of the low temperature of operation of the gas centrifuge rotor, thereby providing an additional safety factor.

This degree of separation is quite small for a single stage, however, if separating rotors are connected in tandem or cascade so that the product of one stage becomes the feed of the following stage and the waste of a particular stage becomes the feed of the preceding stage, then, for example, for ten stages thus connected, but otherwise under the same conditions as given above, $(He^3/He^4)P10 = (4.35)^{10} \times 1.7 \times 10^{-7} = .412$, which is interpreted as an output from the tenth stage of 29.5% helium-3 and 70.5% helium-4.

Example IV (a) Again assuming the separation of helium-3 from a mixture thereof with helium-4 at 10° K. in a centrifuge wherein $L/2r$ is 4, rotating however at a peripheral velocity of 500 meters per second, and wherein the ratio of helium-3 and helium-4 in the feed mixture is $1.7 \times 10^{-7}$. Thus, from Equation 1 for one stage of separation (P1), $(He^3/He^4)P1 = 20.3 \times 1.7 \times 10^{-7} = 3.45 \times 10^{-6}$ or an output from one stage of only $3.45 \times 10^{-4}\%$.

(b) Under the same conditions above described for five stages of cascade separation (P5), $$(He^3/He^4)P5 = (20.3)^5 \times 1.7 \times 10^{-7} = .585$$

or an output from the fifth stage of 37% helium-3 and 63% helium-4.

(c) Similarly, under the same conditions above described, for seven stages of cascade separation (P7), $(He^3/He^4)P7 = (20.3)^7 \times 1.7 \times 10^{-7} = 241$, or an output from the seventh stage of 99.60% helium-3 and 0.4% helium-4.

Example V (a) Again assuming the separation of helium-3 from a mixture thereof with helium-4 at 100° K. in a centrifuge wherein $L/2r$ is 4, rotating at a peripheral velocity of 500 meters per second, and wherein the ratio of helium-3 to helium-4 in the feed mixture is $1.7 \times 10^{-7}$. Thus, from Equation 1 for one stage of separation (P1), $$(He^3/He^4)P1 = 1.35 \times 1.7 \times 10^{-7} = 2.3 \times 10^{-7}$$

or an output from one stage of only $2.3 \times 10^{-5}\%$ helium-3.

(b) Under the same conditions above described for five stages of cascade separation (P5), $$(He^3/He^4)P5 = (1.35)^5 \times 1.7 \times 10^{-7} = 7.66 \times 10^{-7}$$

or an output from the fifth stage of still only $7.66 \times 10^{-5}\%$ helium-3 and approximately 100% helium-4.

(c) Similarly, under the conditions above described, for seven stages of cascade separation (P7), $$(He^3/He^4)P7 = (1.35)^7 \times 1.7 \times 10^{-7} = 1.4 \times 10^{-6}$$

or an output from the seventh stage of still only $$1.4 \times 10^{-4}\%$$

helium-3 and still approximately 100% helium-4.

The effect of the temperature of the gas mixture on the operation of the process is clearly demonstrated by a comparison of Examples IV (a)–(c) with their respective counterparts in Examples V (a)–(c), wherein the identical conditions are assumed with the exception that Examples IV (a)–(c) are derived from a separating operation at 10° K., while those of Examples V (a)–(c) are derived from a separating operation at 100° K., although 100° K. is well within the cryogenic temperature range, it is still too high a temperature to utilize in this particular case to effectuate meaningful separation of helium-3 from helium-4.

Thus application of the centrifugal cryogenic gas separation technique to what is recognized as one of the most difficult isotopic separation problems known can effectively enrich or concentrate rare helium-3 to high purity in a relatively small number of gas centrifuge stages operating in cascade. Each unit can operate at peripheral velocities which may range from 350 meters per second to 500 meters per second. It is possible to achieve greater than 99% helium-3 from a fifteen-unit cascade, each unit of which operates at peripheral velocity of 350 meters per second and even greater than 99% helium-3 with a seven-unit cascade, each unit of which operates at a peripheral velocity of 500 meters per second.

While the gaseous separation method herein has been described by resort to examples, it is believed that these examples are effective to teach the broad application of the method to the separation of any mixture of gases or isotopes of the same gas into components having a significant mass difference.

What is claimed is:

1. The method of separating into constituent parts a mixture of gases and isotopic mixtures of the same gas which comprises lowering the temperature of such mixture into the cryogenic temperature region between the boiling point of such mixture of gases and 273° K., subjecting the cryogenic mixture to centrifugal force by rotating the same at a peripheral velocity of not less than 350 meters per second to separate the constituents into light and heavy effluents, and separately recovering the light and heavy effluents so separated.

2. The method of separating into constituent parts a mixture of gases and isotopic mixtures of the same gas which comprises lowering the temperature of such mixture into the cryogenic temperature region between the boiling point of such mixture of gases and 273° K., introducing such cryogenic mixture into a centrifugal separator, subjecting the cryogenic mixture to centrifugal force within the separator by rotating the latter at a peripheral velocity in excess of 350 meters per second to separate the constituents into light and heavy effluents, and separately recovering the light and heavy effluents so separated.

3. The method of separating into constituent parts a mixture of gases and isotopic mixtures of the same gas which comprises lowering the temperature of such mixture into the cryogenic temperature region between the boiling point of such mixture of gases and 273° K., subjecting the cryogenic mixture to centrifugal force by rotating the same at a peripheral velocity of not less than 350 meters per second in each of a plurality of successive continuous separating stages to separate the constituents into light and heavy effluents, and separately recovering the light and heavy effluents so separated.

4. The method of separating into constituent parts a mixture of gases and isotopic mixtures of the same gas which comprises lowering the temperature of such mixture to a point between the boiling point of such mixture of gases and 273° K. within the cryogenic region, introducing such cryogenic mixture into a plurality of interconnected centrifugal separators, subjecting the cryogenic mixture to centrifugal force in a plurality of successive continuous separating stages by subjecting said mixture to rotation at a peripheral velocity in excess of 350 meters per second within said separating stages to separate the constituents into light and heavy effluents, and separately recovering the light and heavy effluents so separated.

5. The method of separating helium-3 from helium-4 from a mixture of said isotopes which comprises lowering the temperature of said mixture to a point within a range of not substantially below 10° K. and not substantially above 100° K. in the cryogenic region, subjecting the cryogenic mixture to centrifugal force by rotating the same at a peripheral velocity of not less than 350 meters per second to separate the constituents into light and heavy effluents, and separately recovering the light and heavy effluents so separated.

6. The method of separating helium-3 from helium-4 from a mixture of said isotopes which comprises lowering the temperature of said mixture to a point within a range of not substantially below 10° K. and not substantially above 100° K. in the cryogenic region, subjecting the cryogenic mixture to centrifugal force by rotating the same at a peripheral speed of not less than 350 meters per second in each of a plurality of successive continuous separating stages to separate the constituents into light and heavy effluents, and separately recovering the light and heavy effluents so separated.

References Cited by the Examiner

UNITED STATES PATENTS

| | | |
|---|---|---|
| 2,536,423 | 1/1951 | Cohen et al. |
| 2,551,815 | 5/1951 | Schulz _____ 233—11 |
| 2,876,949 | 3/1959 | Skarstrom. |
| 2,893,214 | 7/1959 | Hendal _____ 62—11 |
| 3,126,266 | 3/1964 | Meisler. |

FOREIGN PATENTS

| | | |
|---|---|---|
| 1,058,024 | 5/1959 | Germany. |
| 907,657 | 10/1962 | Great Britain. |

M. CARY NELSON, *Primary Examiner.*

REUBEN FRIEDMAN, *Examiner.*

B. NOZICK, H. KLINKSIEK, *Assistant Examiners.*